(12) United States Patent
Johnson et al.

(10) Patent No.: US 10,353,848 B2
(45) Date of Patent: Jul. 16, 2019

(54) PORTABLE CONTINUOUS INTEGRATION DEVICE AND RELATED SYSTEMS AND METHODS

(71) Applicant: Walmart Apollo, LLC, Bentonville, AR (US)

(72) Inventors: Christopher Soames Johnson, Pea Ridge, AR (US); Matthew Jason Sargent, Bentonville, AR (US); Carlos Puga, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/493,686

(22) Filed: Apr. 21, 2017

(65) Prior Publication Data

US 2017/0308494 A1   Oct. 26, 2017

Related U.S. Application Data

(60) Provisional application No. 62/325,657, filed on Apr. 21, 2016.

(51) Int. Cl.
*G06F 13/40*   (2006.01)
*G06F 13/42*   (2006.01)
(Continued)

(52) U.S. Cl.
CPC ............ *G06F 13/4068* (2013.01); *G06F 8/20* (2013.01); *G06F 8/71* (2013.01); *G06F 13/4282* (2013.01);
(Continued)

(58) Field of Classification Search
CPC ............ G06F 13/4068; G06F 13/4282; G06F 2213/0042; G06F 8/20; G06F 8/71; G06Q 10/101
See application file for complete search history.

(56) References Cited

U.S. PATENT DOCUMENTS 8,037,453 B1   10/2011   Zawadzki
8,285,678 B2   10/2012   Moore, Jr. et al.
(Continued)

OTHER PUBLICATIONS

International Search Report and Written Opinion, for PCT Application No. PCT/US2017/028837, dated Jun. 29, 2017, 10 pages.
(Continued)

*Primary Examiner* — Henry Tsai
*Assistant Examiner* — John B Roche
(74) *Attorney, Agent, or Firm* — Patterson Thuente Pedersen, P.A.

(57) ABSTRACT

Embodiments relate to portable continuous integration (CI) devices configured to facilitate local CI development. In one embodiment, a portable CI device can comprise a housing comprising at least one external port for communications and power; a router disposed in the housing and communicatively coupled within the housing with the at least one external port; and a plurality of processor modules disposed in the housing and including a clock processor module, a memory processor module, a source code management processor module, a continuous integration processor module, a code quality processor module, and a repository management processor module, each of the plurality of processor modules being communicatively coupled with the router.

18 Claims, 5 Drawing Sheets

(51) Int. Cl.
    *G06F 8/20*     (2018.01)
    *G06F 8/71*     (2018.01)
    *G06Q 10/10*     (2012.01)

(52) U.S. Cl.
    CPC ... *G06Q 10/101* (2013.01); *G06F 2213/0042* (2013.01)

(56) References Cited

U.S. PATENT DOCUMENTS

| | | | |
|---|---|---|---|
| 8,533,676 B2 | 9/2013 | Watters et al. | |
| 8,813,040 B2* | 8/2014 | Holler | G06F 11/3684 717/128 |
| 8,954,920 B2* | 2/2015 | Biglari | G06F 8/30 717/100 |
| 9,183,123 B2 | 11/2015 | Spektor et al. | |
| 2013/0212562 A1* | 8/2013 | Fox | G06F 8/65 717/120 |
| 2014/0089896 A1 | 3/2014 | Mansour et al. | |
| 2015/0135158 A1* | 5/2015 | Tenev | G06F 11/3684 717/101 |
| 2016/0321055 A1* | 11/2016 | Mihalcea | G06F 8/24 |

OTHER PUBLICATIONS

JetBrains, Team City, retrieved on Jul. 28, 2017, via https://www.jetbrains.com/teamcity/.
FrozenRidge, LLC, "Docker—the Linux container engine", dated Aug. 9, 2013, 7 pages.
Hickford, "Setting up continuous integration for your database with Red Gate and AppVeyor", dated Jul. 8, 2014, 15 pages.
Kennis, "The Ultimate Continuous Delivery Deploy(It) Toolkit", dated Aug. 5, 2012, 22 pages.
CircleCi, "Ship better code, faster." Retrieved on Dec. 1, 2016, via https://circlecl.com/.
International Preliminary Report on Patentability, for PCT Application No. PCT/US2017/028837, dated Nov. 1, 2018, 9 pages.

* cited by examiner

PORTABLE CONTINUOUS INTEGRATION DEVICE AND RELATED SYSTEMS AND METHODS

RELATED APPLICATION

The present application claims the benefit of U.S. Provisional Application No. 62/325,657 filed Apr. 21, 2016, which is incorporated herein by reference in its entirety.

TECHNICAL FIELD

Embodiments relate generally to devices for developing code and more particularly to portable hardware devices, and related systems and methods, for implementing continuous integration and other code development techniques.

BACKGROUND

Code development typically is carried out via computer stations or devices, such as desktop or laptop computer devices, communicatively coupled with one another via a local or other network. Many modern coding techniques, such as continuous integration (CI) in which the code from one or more developers each working on a copy is updated to a mainline or master copy multiple times in a day, require an active network connection. The active network connection is necessary not only for the updating but also for functionality, as conventional CI and other development tools typically are cloud-based. This requirement, among others, can limit code development settings to those in which significant infrastructure and an active network connection are readily available.

SUMMARY

In an embodiment, a portable continuous integration (CI) device configured to facilitate local CI development comprises a housing comprising at least one external port for communications and power; a router disposed in the housing and communicatively coupled within the housing with the at least one external port; and a plurality of processor modules disposed in the housing and including a clock processor module, a memory processor module, a source code management processor module, a continuous integration processor module, a code quality processor module, and a repository management processor module, each of the plurality of processor modules being communicatively coupled with the router.

In an embodiment, a method of providing a portable continuous integration (CI) device configured to facilitate local CI development comprises obtaining a CI device housing that includes at least one external port for communications and power; arranging a router in the CI device housing and communicatively coupling the router within the CI device housing with the at least one external port; and arranging a plurality of processor modules in the CI device housing, the plurality of processor modules including a clock processor module, a memory processor module, a source code management processor module, a continuous integration processor module, a code quality processor module, and a repository management processor module, and communicatively coupling each of the plurality of processor modules with the router.

In an embodiment, a portable continuous integration (CI) device configured to facilitate local CI development comprises a housing comprising at least one external port for communications and power; a router disposed in the housing and communicatively coupled within the housing with the at least one external port; and a computer processor disposed in the housing, coupled with the router, and including a clock processor module, a memory processor module, a source code management processor module, a continuous integration processor module, a code quality processor module, and a repository management processor module.

BRIEF DESCRIPTION OF THE DRAWINGS

Embodiments may be more completely understood in consideration of the following detailed description of various embodiments in connection with the accompanying drawings, in which.

While embodiments are amenable to various modifications and alternative forms, specifics thereof have been shown by way of example in the drawings and will be described in detail. It should be understood, however, that the intention is not to be limited to the particular embodiments described. On the contrary, the intention is to cover all modifications, equivalents, and alternatives falling within the spirit and scope of the appended claims.

DETAILED DESCRIPTION

Figure 1:
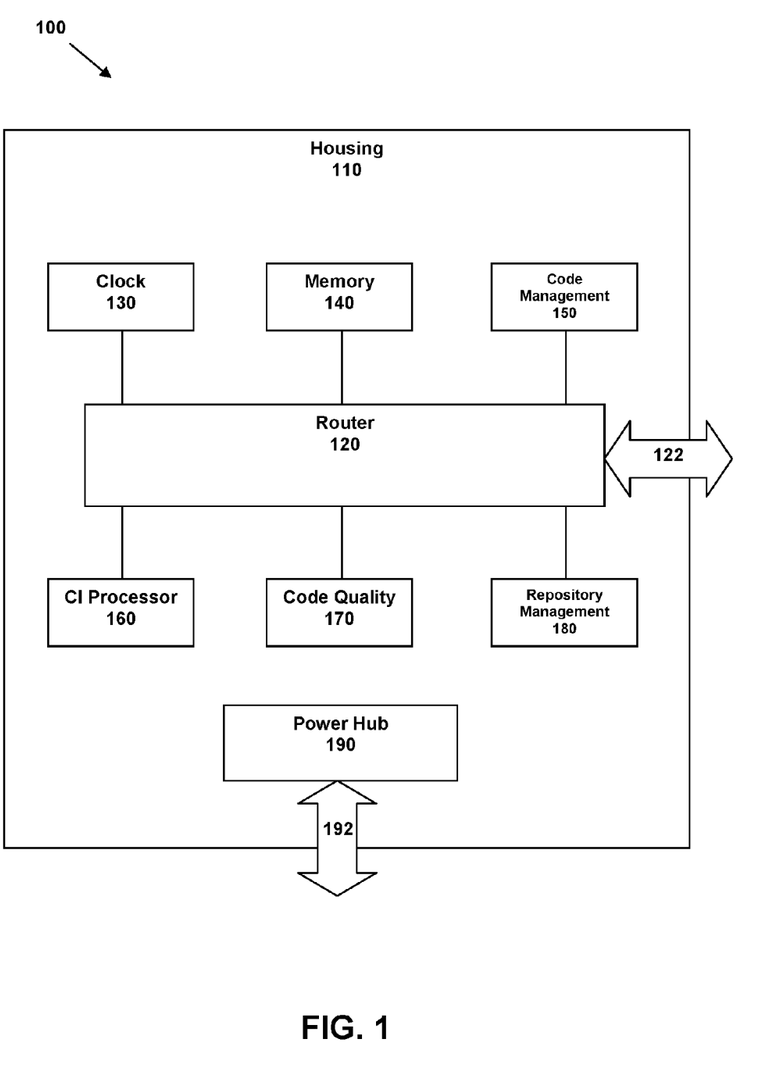
FIG. 1 is a block diagram of portable continuous integration (CI) device according to an embodiment.

Referring to FIG. 1, an embodiment of a portable continuous integration (CI) device 100 is depicted. Device 100 is configured to be operated locally, without an active network connection or with only a local network connection to other devices 100. Device 100 can be selectively communicatively coupled to a network, such as the internet, but does not need to be actively networked in order to operate. In operation, device 100 facilitates code development and can be taken to and operated in settings and situations in which conventional code development practices are not available or practical.

To facilitate this portability, device 100 comprises a housing 110. Housing 110 can comprise a variety of different shapes, sizes or types of cases, such as a briefcase-type case, a box-type case, a clamshell-type case, or some other type of case. Device 100 typically is sized and configured such that it is easily carried, via housing 110, by one person. Housing 110 can comprise at least one latch or other integral or separable device to keep housing 110 selectively closed or secured when in transit or not in use. As discussed below, device 100 can comprise one or more input/output (I/O) ports for communications and power, and those ports can be integrated into housing 110 such that they are accessible without opening housing 110. In other embodiments, the ports can be accessed only when housing 110 is opened. In one example embodiment, housing 110 comprises a rigid clamshell-style case comprising at least one handle or shoulder strap, at least one integrated latch device, and at least one port accessible via an exterior of housing 110.

Within housing 110, device 100 comprises a router 120, a plurality of processor devices 130, 140, 150, 160, 170, 180 and a power hub 190. Router 120 can comprise a multi-port router (e.g., 8 ports in the example embodiment of FIG. 1) and be communicatively coupled with each of the plurality of processors 130-180 and electrically coupled with power hub 190. Router 120 can be coupled with at least one external communications port 122, such as a Universal Serial Bus (USB) port, a FireWire port, and/or any other kind of communications port that can facilitate data exchange between device 100 and at least one other external device, such as a network or a computer device. In some embodiments, port 122 can be integrated with a power port, such as in embodiments in which port 122 comprises a USB port via which both communications and power can be coupled with device 100. In these embodiments, a port 192 of power hub 190 may be omitted. Power hub 190 is discussed in more detail below.

As previously mentioned, router 120 is communicatively coupled with a plurality of processor devices 130, 140, 150, 160, 170 and 180. In the embodiment depicted in FIG. 1, each processor device 130-180 comprises a separate processor device, though one or more processor devices 130-180 can be combined in other embodiments discussed herein below. Each separate processor device can comprise a printed circuit board (PCB), a central processing unit (CPU, communications circuitry, and other components and circuitry, though in some embodiments multiple processor devices can be integrated on a single or plurality of PCBs or other structures. The CPU can comprise a commercially available device capable of carrying out the functionality of each processor device 130-180. In one embodiment, the CPU of each processor device 130-180 is the same, while in other embodiments one or more of the CPUs may be different (e.g., faster or with other enhanced performance features). For example, the CPU of one or more of processor devices 130-180 can comprise a 900 MHz 32-bit quad-core CPU, a 1.2 GHz 64-bit quad-core processor, or some other processor device. The communications circuitry can comprise wired and/or wireless communications circuitry, such as to enable each processor device 130-180 to communicate, with or via router 120, internal or external components or devices. In still other embodiments, processor devices 130-180 can comprise the hardware and circuitry to facilitate wired or wireless LAN, BLUETOOTH, or other communications.

In some embodiments, each processor device 130-180 can be an off-the-shelf module that is assembled in and programmed for device 100. One example of the type of device that may be suitable is a RASPBERRY PI, though other simple, off-the-shelf processor devices also can be used. In other embodiments, each processor device 130-180 can be custom built or assembled from available components for use in device 100.

In the embodiment of FIG. 1, each processor device 130-180 has a particular task or functionality. Each will be discussed below. Discussion of each as a processor device in the context of the embodiment of FIG. 1 is not limiting with respect to other embodiments in which similar functions and capabilities are carried out by combined processors, modules or other configurations.

Clock processor device 130 comprises a time module configured to keep and provide a common clock signal for device 100. This keeps processor devices 130-180 consistent with one another in operation. In embodiments, clock processor device can comprise hardware as discussed elsewhere herein and proprietary or open source software, or a combination thereof.

Memory processor device 140 comprises a hard drive or other storage hardware for device 100 and can store and retrieve data, databases, fileshares and other information from and/or for use by the various processor devices 130-180 and other components of device 100. In some embodiments, memory processor device 140 can comprise hardware as discussed elsewhere herein and proprietary or open source software, or a combination thereof. In other embodiments, memory processor device 140 can comprise a custom device or board for use within device 100. The proprietary or open source software can comprise one or more of a custom database, a reporting database, or a database or repository particular to a software product or package used by device 100, such as a SonarSource database, a Git repository, a Nexus repository, or some other database or repository used by a component or feature of device 100. In embodiments in which multiple devices 100 are used together, such as with one functioning as a federation device, memory processor device 140 (as well as other components and features of device 100) can be made available as a shared location among one or more of the multiple devices 100.

Code management processor device 150 comprises a source code management tool and can operate as a management layer within device 100. In embodiments, code management processor device 150 can comprise hardware as discussed elsewhere herein and proprietary or open source software, or a combination thereof. For example, in one embodiment code management processor device 150 can comprise a Git source code management tool. Git is an open source distributed version control system and can be suitable in embodiments, though other programs and systems can be used in other embodiments, including proprietary or custom-built programs and systems. In one embodiment, code management processor device 150 can be made available on port 8888.

CI processor device 160 comprises a continuous integration "build box" tool. In embodiments, code management processor device 150 can comprise hardware as discussed elsewhere herein and proprietary or open source software, or a combination thereof. For example, in one embodiment CI processor device 160 comprises Jenkins, an open source automation server, though in other embodiments some other automation server, including proprietary or custom-built programs and systems, can be used. Jenkins or another automation server of CI processor device 160 can be preset with plugins and standard and custom settings for use in CI development in device 100. In one embodiment, CI processor device 160 can be made available on port 8080.

Code quality processor device 170 comprises a static code analysis tool. In embodiments, code management processor device 150 can comprise hardware as discussed elsewhere herein and proprietary or open source software, or a combination thereof. For example, in one embodiment code quality processor device 170 comprises SonarQube, an open source quality management platform that can analyze and measure source code quality. In other embodiments, some other source code quality tool, including proprietary or custom-built programs and systems, can be used. SonarQube or another source code quality tool of code quality processor device 170 can be pre-set with standard and custom settings for device 100. In one embodiment, code quality processor device 170 can be made available on port 9000.

Repository management processor device 180 comprises a component warehouse and distribution manager to store components, assemblies, binaries and other parts. In embodiments, repository management processor device 180 can comprise hardware as discussed elsewhere herein and proprietary or open source software, or a combination thereof. For example, in one embodiment repository management processor device 180 can comprise Sonatype Nexus, an open source software tool, though in other embodiments some other repository management tool, including proprietary or custom-built programs and systems, can be used. In one embodiment, repository management processor device 180 can be made available on port 8081.

Figure 2:
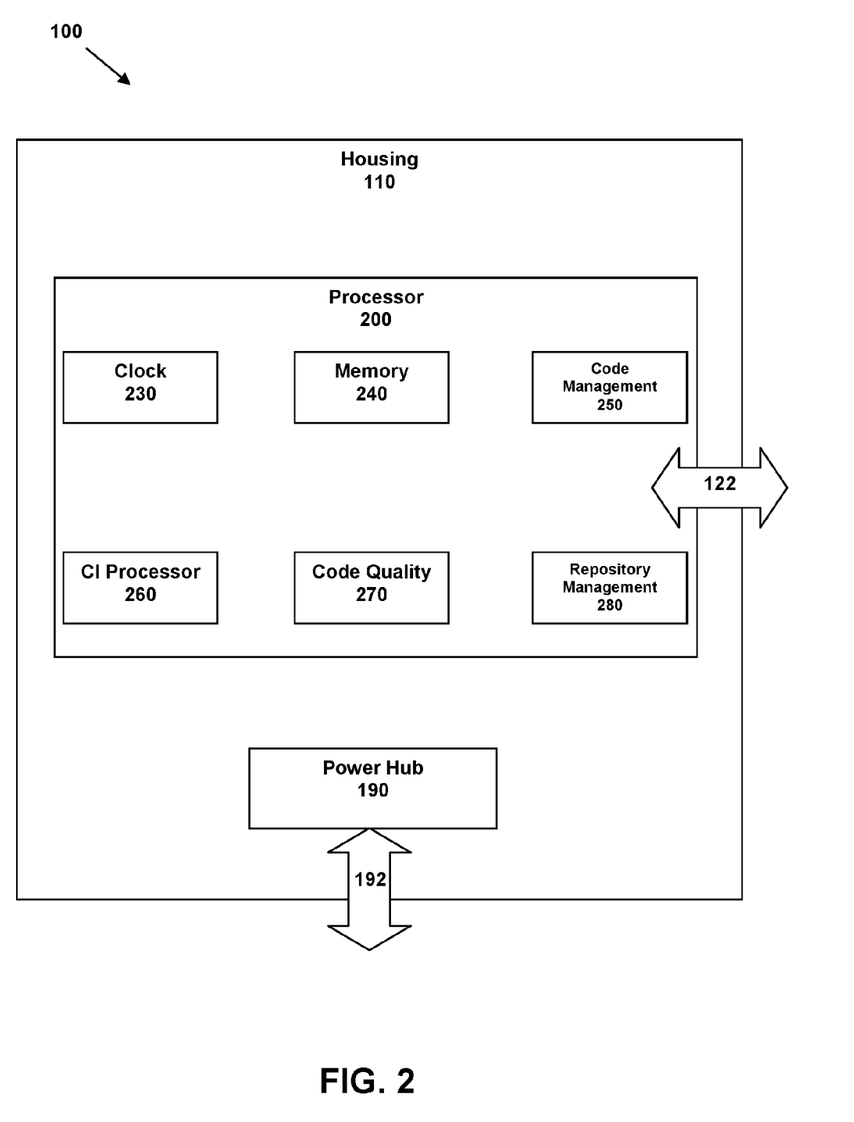
FIG. 2 is a block diagram of portable continuous integration (CI) device according to an embodiment.

In other embodiments of device 100, and referring to FIG. 2, processor devices 130-180 can be integrated in one or more processors, rather than comprising six individual processor devices as depicted in FIG. 1. For example, device 100 can comprise a processor device 200 that includes a clock module 230, a code management module 250, a CI processor module 260, a code quality module 270, and repository management module 280. Processor device 200 can further comprise a memory module 240, or processor device 110 can be communicatively coupled with a separate memory or database module of device 100. In such an embodiment, router 120 may be omitted. Still other configurations are possible, including those in which device 100 comprises a first processor device that comprises the features and functionality of at least one of the processor modules 230-280 and at least one second processor device that comprises others of the features and functionality of the processor modules 230-280. Router 120 may be included in device 100 in such an embodiment. In other words, various embodiments can comprise a single processor device (200) or a plurality of processor devices, in a variety of configurations with respect to the features and functionality of processor devices 130-180 as discussed herein.

Referring again also to FIG. 1, in embodiments power hub 190 can comprise a USB hub device arranged within housing 100. In other embodiments, some other type of hub or power supply can be used, with the general requirement that power hub 190 is configured to supply power to device 100, in particular to router 120, processors 130-180, and any other components or features of device 100 requiring power to operate. In general, power hub 190 can interface with a 110/120 or 220/240 V input supply, but power hub 190 can comprise or cooperate with an adapter or transformer to meet other power requirements. In embodiments in which power is supplied via a USB cable or device, power hub 190 can interface with 2.5 V, 5 V, 12V or 20 V, or other voltages if or when USB standards are changed or updated.

In embodiments, device 100 and its components, particularly cooperative processor devices 130-180, enable a user to develop code, including using CI techniques and processes. Device 100 is portable and does not require the conventional rack-mounted and proprietary hardware used in enterprise/data centers. Its portability enables device 100 to be mobile and taken on site, in a variety of locations and settings, for use. Because device 100 comprises processor devices 130-180 with their full functionality locally (i.e., without requiring cloud-based or other tools accessible via a network), device 100 is self-contained and does not need an active network or internet connection in operation. During development, device 100 can be used locally, un-networked or in a network of locally operating devices, requiring only input power to be operational.

Figure 3:
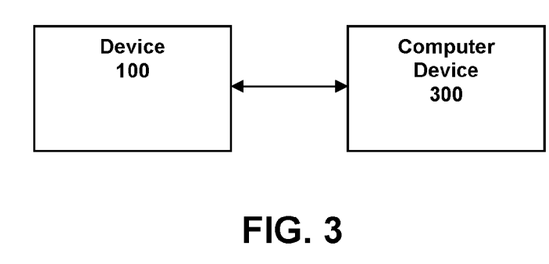
FIG. 3 is a block diagram of a system according to an embodiment.

In embodiments, device 100 may be used in conjunction with another device, such as a computer device 300 as depicted in FIG. 3. Computer device 300 can comprise a laptop computer, tablet or other portable computing device in embodiments in which mobile or portable on-site use of device 100 is desired. Computer device 300 also can comprise a locally networked computer device, including a desktop computer, in other embodiments. While computer device 300 can facilitate or provide a network connection, such a connection (to device 300 or a network or the internet more generally) is not required for operation of device 100. More commonly, device 100 can be used with device 300 because device 300 can provide convenient I/O features, including a keyboard for writing code, a mouse, and a screen for viewing data and information input into and received from device 100.

Periodically or as needed, device 100 (via device 300, directly via router 120 or in some other way) can be communicatively connected with a network or the internet to upload or share development progress and receive updates, which can be particularly useful in CI or cooperative development efforts. These connections are not necessary for the general functionality of device 100, however, in contrast with conventional CI development tools. Rather, they can enable device 100 to share local development efforts, receive information regarding other development efforts or information from other devices 100 or sources, and then go offline again to continue progress. Additionally, the portability and local operation of device 100 enable it to be used in a variety of settings, such as facilities that are not yet online or do not have suitable network connections available, mobile sites (e.g., even including coffee shops, because of the portability and reasonable physical size of device 100), and at sites or for projects in which security is of sufficient concern that a networked connection is desired to be avoided or minimized.

During network or other external communications by device 100, a variety of information can be sent or received by device 100. For example, device 100 can provide or receive data and information for reporting functions (e.g., development status) and lifecycle updates and analysis, including with respect to bill of materials, product analysis, publishing, documentation, testing, failures, version in production or development, and other data and information useful or necessary during development or deployment. In embodiments in which device 100 is used with computer device 300, computer device 300 can facilitate a user interface "dashboard" for viewing and interacting with this information, including for assembling reports, obtaining current status information, requesting particular information, and analyzing data and statistics related to a product of device 100 once developed and delivered, among other tasks and features. In other words, access to full application lifecycle data and information for any products of device 100 is possible, providing access to more data and information than is available via conventional systems and devices. In still other embodiments, information regarding a plurality of devices 100, federations of devices 100 (discussed in more detail below), or products of devices 100 can be assembled and reported, providing various levels of reporting information and detail.

Figure 4:
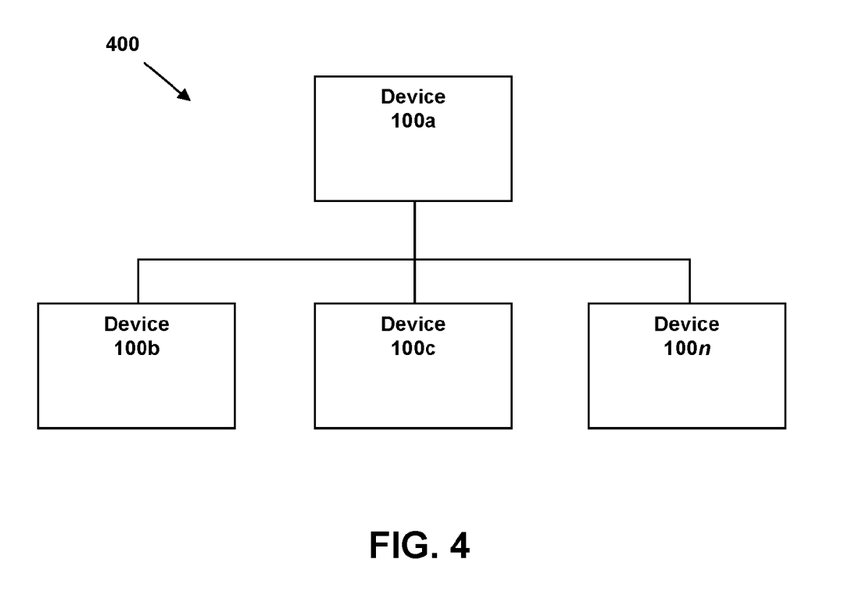
FIG. 4 is a block diagram of a device federation according to an embodiment.

Referring to FIG. 4, device 100 also can be used in a network or federation 400 of similar devices 100a, 100b and 100n. Operatively connecting a plurality of devices 100 in federation 400 enables a local network to be formed for CI and other development efforts. As for device 100 alone, federation 400 can be operated locally, without an active or continuous network (e.g., internet) connection, or it can be networked occasionally, as needed or desired, or continuously.

In federation 400, one device 100a can be a master or coordinating device, while other devices 100b, 100c and 100n operate subordinate to device 100a or rely on device 100a to coordinate or control efforts among them. In embodiments, device 100a can push or pull data to or from any or all of devices 110b, 100c, 100n and can function as a go-between for federation 400 with a network, computer device (e.g., device 300 of FIG. 3), or other device. Other federation structures and hierarchies are possible in other embodiments, with federation 400 being but one example architecture. The same application lifecycle reporting features, including via a dashboard of device 300 or some other device, are also available for federation 400, which can provide even more information about the various components and features in development, including by any individual one device 100a, 100b, 100c, 100n of federation 400.

Whether operating individually or in a federation, device 100 can provide additional user convenience and help features. In embodiments, device 100 can operate in one or more "wizard" modes to assist a user with setting up device 100 and getting started on a development effort. A first wizard mode can assist an average or typical user by walking the user through a set-up process. This process will not require the user to know detailed settings or other information in embodiments but can ask a user to input basic information in order to facilitate set-up. In still other embodiments, this wizard mode of device 100 can be fully automated and/or rely on set-up information within device 100 or obtainable via a federation or temporary network connection to facilitate set-up information exchange. A second wizard mode can assist experienced or expert users with set-up, enabling these users to modify or customize device 100, federation 400 or other features related to device 100 for their particular preferences or use cases. Additional wizards or set-up modes also can be implemented, including standard vs. custom, with those characteristics being with respect to general usage of device 100 or usage of device 100 within a particular organization or context. In other words, an organization using one or more devices 100 could customize them for particular departments, use cases, business units or according to other characteristics so that they assist users according to particular or individual needs. This customization can be done directly via device(s) 100 or federation(s) 400 or pushed to device(s) 100 or federation(s) 400 via a network or other device.

Figure 5:
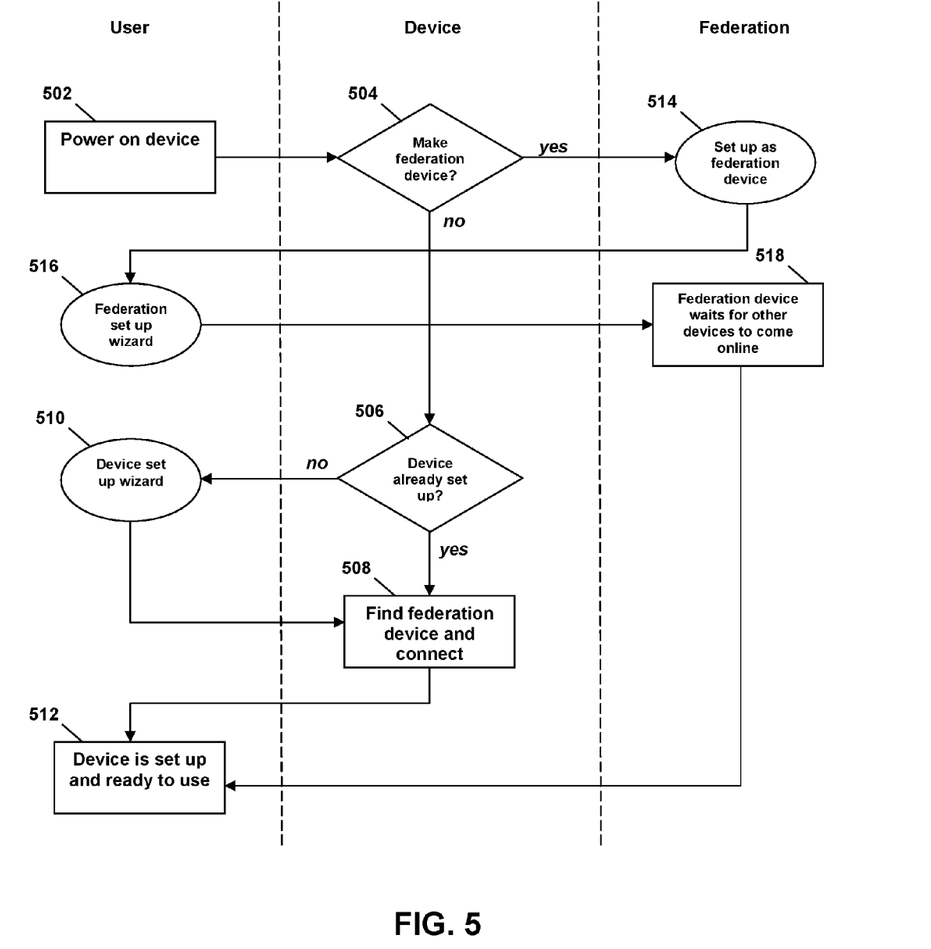
FIG. 5 is a flowchart related to a set-up process for a portable CI device according to an embodiment.

FIG. 5 is an embodiment of a method or process for setting up a device 100 or a federation 400 of devices 100n. At 502, device 100 is powered on. At 504, device 100 asks the user whether it is to be a federation device. If it is not, device 100 asks the user (or independently checks) whether it is already set up at 506. If it is already set up, device 100 optionally looks for a federation device to connect with at 508; if it is not already set up, device 100 walks the user through the set-up wizard at 510. The wizard can request input information, such as product names and other information requested or required by processor devices 130-180 of device 100. Device 100 then can optionally return to 508, otherwise it is set up and ready to use (512). In embodiments, 508 between 510 and 512 can be omitted.

Returning to 504, if device 100 is to be a federation device, particularly a master or controlling federation device, it is set up as a federation device at 514. This can be done using the federation set-up wizard at 516. The wizard can request input information, such as product names and other information requested or required by processor devices 130-180 of device 100, as well as information to identify device 100 within the federation, once established. Once set up, device 100 waits for other federation devices to come online and connect at 518, after which device 100 (and the federation) are set up and ready to use (512).

Figure 6:
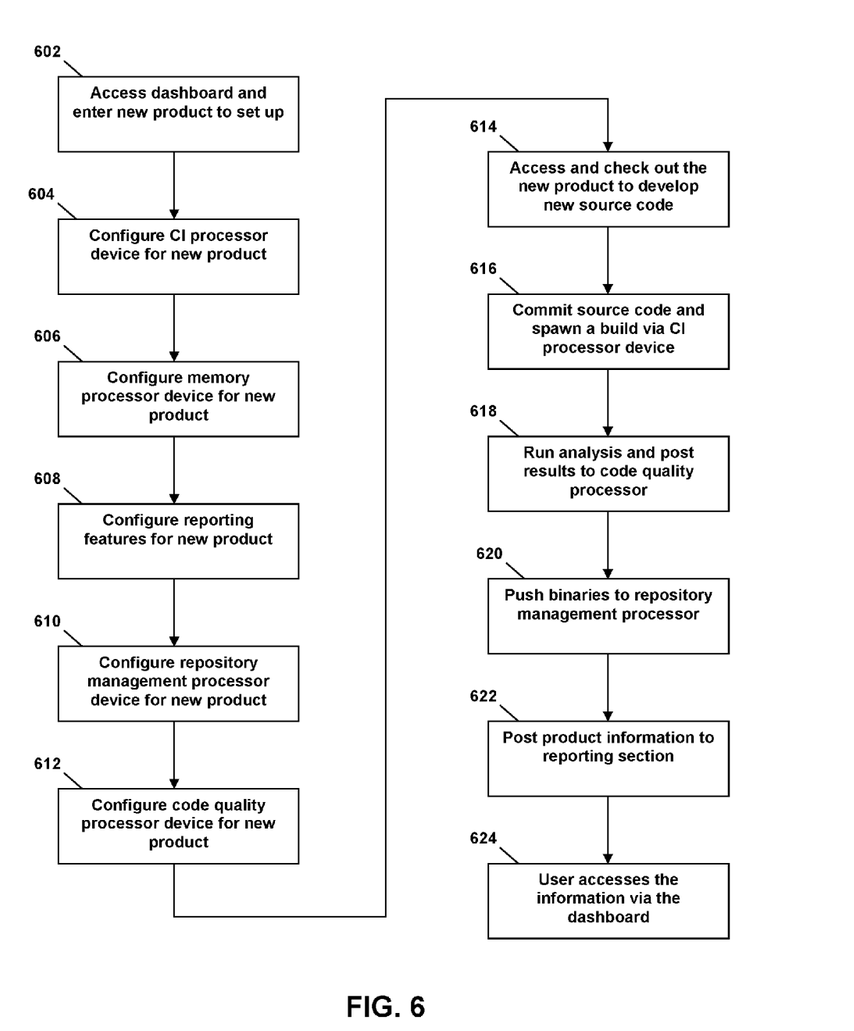
FIG. 6 is a flowchart related to a new product development process using a portable CI device according to an embodiment.

Once it is ready to use, device 100 can be used in a method or process like the one depicted in FIG. 6. At 602, a user can access the dashboard and enter a new product to be developed using device 100. The dashboard can be accessed via computer device 300 and is generally available via a network connection, such as the internet. Offline or local versions of the dashboard can be available in some embodiments. At 604, CI processor device 160 of device 100 is configured to support development of the new product. At 606, memory processor device 140 of device 100 is configured to support development of the new product. At 608, reporting features of device 100 are configured for the new product. At 610, repository management device 180 is configured to support development of the new product. At 612, code quality processor 170 is configured to support development of the new product. In embodiments, the tasks at 604, 606, 608, 610 and 612 can comprise writing information to or reading information from device 100. These tasks, and others of FIG. 6, may be reordered in other embodiments.

Generally, device 100 is ready to support product development following task 612. At 614, a user can access and check out the new product (e.g., from memory processor device 140) and beginning writing source code or otherwise developing the new product. In embodiments, this can be done locally, without device 100 having an active network connection. Periodically or when complete, the user can commit the source code, which in turn spawns a build operation via CI processor device 160. At 618, device 100 can run analysis and post results to code quality processor device 170, and binaries related to the code can be pushed to repository management processor device 180 at 620. Product information can be posted to the reporting section at 622, which a user can access via the dashboard at 624.

The tasks of FIG. 6 can be reordered, or tasks added or omitted, in other embodiments. In some embodiments, multiple users can carry out some of the tasks in parallel, such as in a federation of devices 100. For example, different users may develop different portions or features of the new product, such that each checks out a different portion at 614 and executes 614 and 616 in parallel.

Embodiments provide numerous advantages with respect to conventional approaches. As previously mentioned, device 100 can be portable and operable locally, offline. This enables device 100 to be used in settings and ways in which conventional rack-mounted and cloud-based server systems cannot. For example, device 100 could be taken to and used in a new commercial space in which no network infrastructure is yet available. Device 100 also could be used in a coffee shop, school, church, hotel, clinic, hospital, office or other setting, without requiring a continuous active network or internet connection in order to facilitate code development. Device 100 also can be used in areas, settings or industries that are not networked or connected to the internet, at all or consistently, including in cases in which isolation for security or other reasons is desired or required.

Device 100 is also less expensive and can provide cost savings with respect to the hardware itself as well as cooling, floor space, and power, among others. Device 100 also provides reporting and analysis capabilities not available with conventional approaches, which can speed and improve development efforts. Additionally, the wizard modes provide user assistance and can speed set-up and development efforts overall.

In embodiments, device 100 and/or its components or systems can include computing devices, microprocessors and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A portable continuous integration (CI) device configured to facilitate local CI development, the CI device comprising:
   a housing comprising at least one external port for communications and power;
   a router disposed in the housing and communicatively coupled within the housing with the at least one external port; and
   a plurality of processor modules disposed in the housing and including a clock processor module, a memory processor module, a source code management processor module, a continuous integration processor module, a code quality processor module, and a repository management processor module, each of the plurality of processor modules being communicatively coupled with the router such that the continuous integration processor module can interact with at least one of the clock processor module, the memory processor module, the source code processor module, the code quality processor module and the repository management module to perform a build operation without an active network connection;

wherein the at least one external port presents an interface enabling a computing device to:
provide a source code file to the source code management processor module, and
instruct the continuous integration processor module to perform a build operation using the source code file.

2. The CI device of claim 1, wherein the at least one external port comprises a first external communications port and a second external power port.

3. The CI device of claim 1, wherein the at least one external port comprises a dual-function communications and power port.

4. The CI device of claim 3, wherein the at least one external port comprises a USB port.

5. The CI device of claim 1, wherein each of the plurality of processor modules comprises a computer processor.

6. The CI device of claim 1, wherein at least two of the plurality of processor modules are integrated in a single computer processor.

7. The CI device of claim 1, wherein the CI device is configured to be communicatively coupled to at least one additional CI device by the at least one external port.

8. The CI device of claim 1, wherein the CI device is configured to be communicatively coupled to at least one of a computer or a network by the at least one external port.

9. The CI device of claim 8, wherein the plurality of processor modules are configured to generate a report of a status of the CI device.

10. The CI device of claim 9, wherein the at least one of a computer or a network comprises a dashboard configured to present the report.

11. A method of providing a portable continuous integration (CI) device configured to facilitate local CI development, comprising:
obtaining a CI device housing that includes at least one external port for communications and power;
arranging a router in the CI device housing and communicatively coupling the router within the CI device housing with the at least one external port; and
arranging a plurality of processor modules in the CI device housing, the plurality of processor modules including a clock processor module, a memory processor module, a source code management processor module, a continuous integration processor module, a code quality processor module, and a repository management processor module, and communicatively coupling each of the plurality of processor modules with the router such that the continuous integration processor module can interact with at least one of the clock processor module, the memory processor module, the source code processor module, the code quality processor module and the repository management module to perform a build operation without an active network connection;
such that the at least one external port presents an interface that enables a computing device to:
provide a source code file to the source code management processor module, and
instruct the continuous integration processor module to perform a build operation using the source code file.

12. The method of claim 11, further comprising configuring the plurality of processor modules to generate a report of a status of the CI device.

13. The method of claim 12, wherein the report can be accessed via a web page when the CI device is connected to a network.

14. The method of claim 13, wherein the report is presented on the web page as a dashboard.

15. The method of claim 11, further comprising configuring the plurality of processor modules to coordinate with another plurality of processor modules when the CI device is communicatively coupled with another CI device via the at least one external port.

16. The method of claim 11, further comprising configuring the plurality of processor modules to operate in a wizard set-up mode to begin a new project.

17. The method of claim 16, wherein configuring the plurality of processor modules to operate in a wizard set-up mode further comprises connecting the CI device to a network to enable a user to access a dashboard for the wizard set-up mode.

18. A portable continuous integration (CI) device configured to facilitate local CI development, comprising:
a housing comprising at least one external port for communications and power;
a router disposed in the housing and communicatively coupled within the housing with the at least one external port; and
a computer processor disposed in the housing, coupled with the router, and including a clock processor module, a memory processor module, a source code management processor module, a continuous integration processor module, a code quality processor module, and a repository management processor module such that the continuous integration processor module can interact with at least one of the clock processor module, the memory processor module, the source code processor module, the code quality processor module and the repository management module to perform a build operation without an active network connection,
wherein the at least one external port presents an interface enabling a computing device to:
provide a source code file to the source code management processor module, and
instruct the continuous integration processor module to perform a build operation using the source code file.

* * * * *